United States Patent [19]
Komatsu et al.

[11] Patent Number: 4,802,040
[45] Date of Patent: Jan. 31, 1989

[54] DISK-TYPE RECORDING AND REPRODUCING APPARATUS

[75] Inventors: Fumito Komatsu; Yuzo Oguchi; Akiyoshi Toyama; Kiyoharu Iwanami, all of Nagano, Japan

[73] Assignee: Kabushiki Kaisha Sankyo Seiki Seisakusho, Nagano, Japan

[21] Appl. No.: 105,446

[22] Filed: Oct. 5, 1987

Related U.S. Application Data

[63] Continuation of Ser. No. 720,239, Apr. 5, 1985, abandoned.

[30] Foreign Application Priority Data

Apr. 5, 1984 [JP] Japan .................... 59-68199
May 16, 1984 [JP] Japan .................... 59-98253

[51] Int. Cl.$^4$ .......................... G11B 5/012; G11B 5/55
[52] U.S. Cl. ........................ 360/78.04; 360/106; 360/99.08
[58] Field of Search ............... 360/75, 78, 86, 97, 360/99, 106, 107

[56] References Cited

U.S. PATENT DOCUMENTS 3,781,018 12/1973 Cayton, Jr. .................... 360/106
4,609,954 9/1986 Bolton et al. .................. 360/106
4,614,984 9/1986 Tezuka ......................... 360/105 X
4,652,947 3/1987 Oka et al. ..................... 360/85

FOREIGN PATENT DOCUMENTS 0212663 12/1982 Japan ........................... 360/75

OTHER PUBLICATIONS

IBM Technical Disclosure Bulletin; Archmedean Cam Actuator for Transducer; Holecek et al., vol. 22, No. 9, Feb. 1980.

Primary Examiner—Robert S. Tupper
Assistant Examiner—Andrew L. Sniezek
Attorney, Agent, or Firm—Sughrue, Mion, Zinn, Macpeak & Seas

[57] ABSTRACT

A disc-type recording and reproducing system in which only a single motor is required for rotating the disc and for moving a magnetic head radially with respect to the disc. The system includes a continuously rotating body, a coupling rotary body rotated by the continuously rotating body, a subordinate rotary body rotated by the continuously rotated body, and a cam having a head-moving cam surface whose diameter changes in steps and engagement recesses corresponding to each diameter step rotatably holding the coupler rotary body. A head movement control mechanism is engageable with the engagement portion of the cam for controlling the rotation of the cam and allowing the subordinate rotary body to continue rotating while the head is not moving. The head control device releases control of the rotation of the cam and controls rotation of the subordinate rotary body while the head is moving.

3 Claims, 16 Drawing Sheets

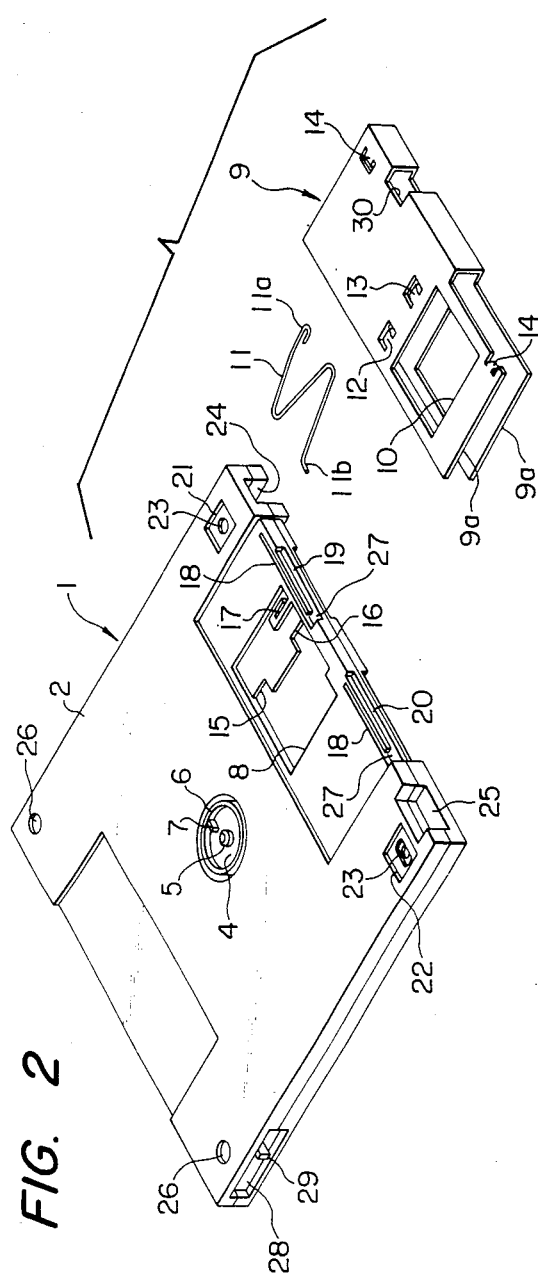
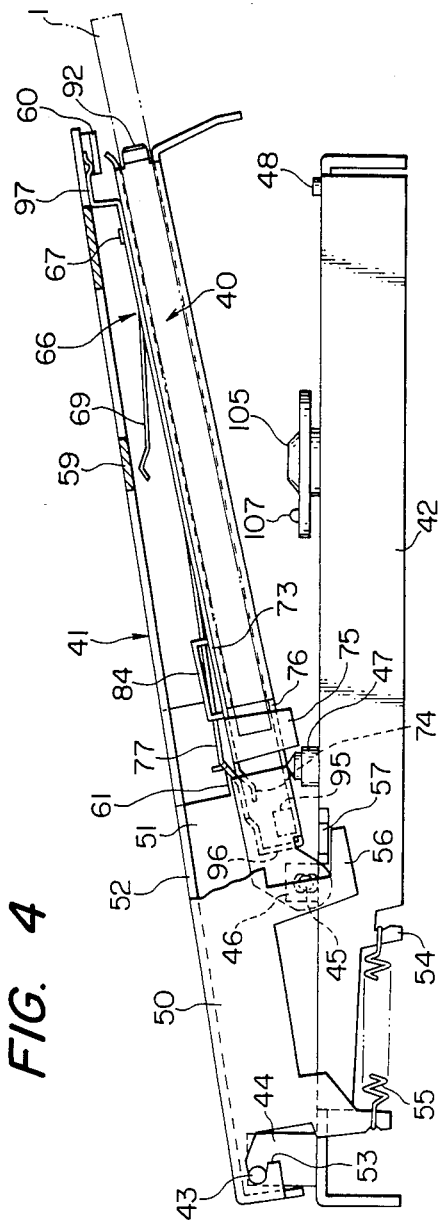
FIG. 2
FIG. 4

DISK-TYPE RECORDING AND REPRODUCING APPARATUS

This is a division of application Ser. No. 720,239, filed Apr. 5, 1985, now abandoned.

BACKGROUND OF THE INVENTION

The present invention relates to a disc-type recording and reproducing apparatus for recording and reproducing information signals on a disc, particularly, a magnetic disc, while intermittently moving a scanning head, namely, a magnetic head, in the radial direction of the disc.

Heretofore, a stepping-type or voice coil-type motor has been used to move the magnetic head in the radial direction of a magnetic disc for recording or reproduction so as to position the head at a designated concentric track on the disc. However, because the motor for radially moving the magnetic head must be intermittently operated in the conventional disc apparatus, the magnetic head driving mechanism tends to be costly. Specifically, separate motors have been provided for rotating the magnetic disc and for moving the magnetic head.

SUMMARY OF THE INVENTION

Accordingly, an object of the present invention is to provide a disc-type recording and playback apparatus wherein a scanning head is moved by a continuously rotating motor rather than by an expensive stepping-type or voice coil-type motor.

Another object of the present invention is to provide a disc-type recording and playback apparatus wherein a single motor is used both to drive a rotary disc and intermittently move a scanning head so as to thereby simplify the construction of the disc-type recording and playback apparatus.

Still another object of the present invention is to provide a disc-type recording and playback apparatus wherein a mechanism for intermittently moving a scanning head is made small and compact.

A further object of the present invention is to provide a disc-type recording and playback apparatus wherein the track position of a scanning head can readily be detected.

According to the present invention, a single motor is used to drive both a spindle hub and a magnetic head, the latter drive being effected by converting the output of the motor into an intermittent rotary movement when movement of the head is desired. The intermittent rotary movement is employed to drive a cam, which is simultaneously used to move a magnetic head in the radial direction of the disc. Accordingly, it is unnecessary to use an expensive motor for providing intermittent movement for driving the magnetic head. As a result, a single motor can effectively be used to drive the magnetic disc and move the magnetic head.

BRIEF DESCRIPTION OF THE DRAWINGS

FIG. 2 is an exploded perspective view of the magnetic disc cassette;

FIG. 4 is a side view of a recording a reproducing mechanism of the present invention;

DESCRIPTION OF THE PREFERRED EMBODIMENTS

Figure 1:
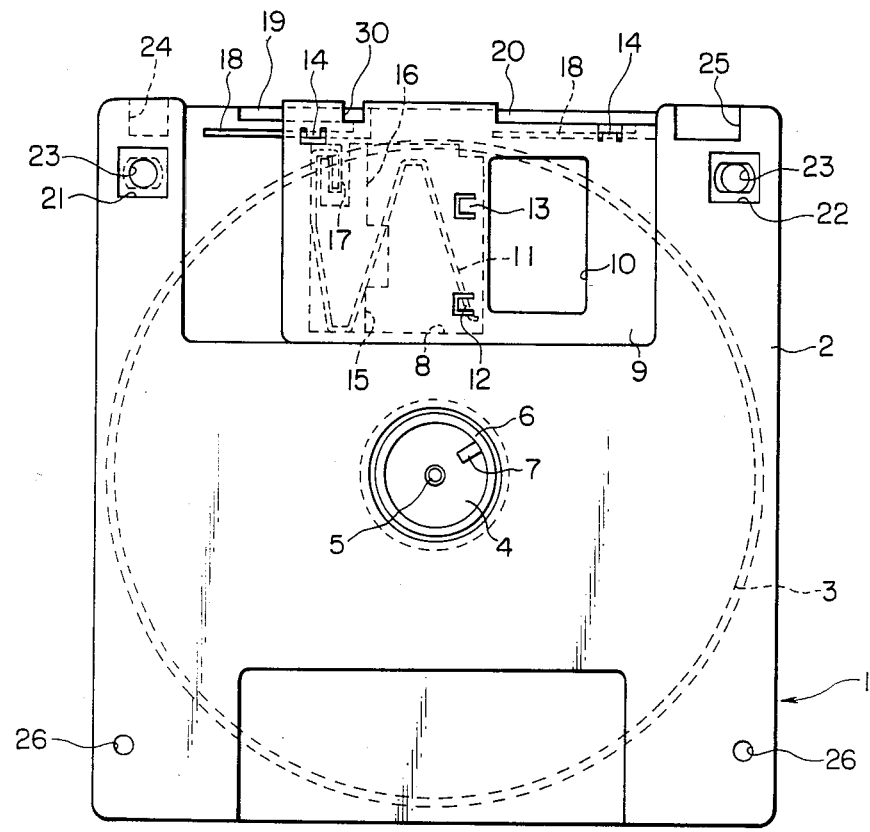
FIG. 1 is a top view of a magnetic disc cassette usable in the present invention.

Referring now to the drawings, a preferred embodiment of the present invention will be described.

Figure 3:
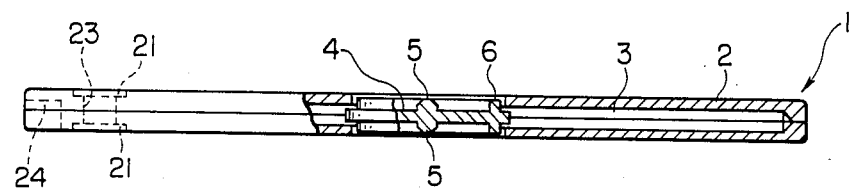
FIG. 3 is a fragmentary sectional side view of the magnetic disc cassette.

In FIGS. 1 through 3, a magnetic disc applicable to a system embodying the present invention will be described first. The magnetic disc shown in FIGS. 1 through 3 is of a cassette type. A magnetic disc cassette 1 includes a flat, box-like hard case 2 and a rotatable flexible disc 3 contained therein. In the center of the disc 3 is incorporated a disc hub 4, which is equipped with conical bosses 5 projecting from the centers of the top and bottom surfaces thereof. A circular boss 6 is provided around the bosses 5, while an engagement boss 7, triangular in cross section, is provided inside the boss 6, the boss 7 being used to rotatably drive the disc hub 4 by engaging with a boss of a spindle hub 105 (described below). The disc hub 4 having the bosses 5, 6 is exposed through a window formed in the case 2. Openings 8 are made in the top and bottom surfaces on one of the edges of the case 2 so as to enable a magnetic head to contact the recording face of the disc 3. There are also provided steps slightly set back from the surfaces of the case 2 on the edge thereof, and there is installed a shutter plate 9 sandwiching the case 2, the shutter plate 9 being slidable along the step portions. The shutter plate 9 is provided with a double window 10 thereacross allowing the magnetic head to enter and contact the recording face of the disc 3 therethrough. A pair of bent-down pieces 12, 13 and a pair of bent-down guide pieces 14 are formed in the shutter plate 9. The guide pieces 14 are used to guide the slidable shutter plate 9 while engaging with guide grooves 18 formed along the edge of the case 2. Square cuts 15, 16 contiguous to the openings 8 of the case 2 are provided with which the bent-down pieces 12, 13 of the shutter plate 9 are prevented from touching the edge of the openings 8 when the shutter plate 9 moves to the left.

In the case 2 is formed a groove 17 into which a J-shaped bend 11a of a spring 11 is received. Cuts 19, 20 are provided into which are slidably fitted pins (described below), thereby permitting the shutter plate 9 to slide parallel to the guide grooves 18. The bend 11a of the spring 11 is fitted in the groove 17 before being fixed thereto by heating the periphery thereof. The shutter plate 9 is attached to the case 2 by pushing its vertical lap portion open. In this case, the guide pieces 14 of the shutter plate 9 are inserted through cuts 27 which communicate with the guide grooves 18 of the case 2. At this time, the left end portions of the shutter plate 9 (FIG. 2) make contact with the two surfaces of the case 2, each being a step higher than the step on which the shutter plate 9 is mounted.

When the shutter plate 9 is moved along the guide grooves 18, the guide pieces 14 fit into the guide grooves 18, whereas the left end portions 9a of the shutter plate drop onto the steps of the case 2. The lap portion of the shutter plate 9 which has been forced open returns to the former state, allowing the guide pieces 14 to maintain engagement with guide grooves 18 and thus preventing the shutter plate 9 from becoming detached. In the above-described state where the shutter plate 9 has been attached to the case 2, the L-shaped bend 11b, or the other end of the spring 11, is hooked onto the bent-down piece 12 of the shutter plate 9. The shutter plate 9 is thus energized by the resilient force of the spring 11 to slide in the direction of covering the openings 8 such that the windows 10 of the shutter plate 9 and the openings 8 are not registered with one another. If the shutter plate 9 is slid against the force of the spring 11, the spring 11 will engage with the bent-down piece 13 of the shutter plate 9 to prevent the bend 11b of the spring 11 from being released from the bent-down piece 12. There is also formed a cut 30 in the shutter plate 9 for a pin 89 of a closing member 31 (described below) to engage therewith.

In the square corners of the hard case 2 are provided square recesses 21, 22, circular apertures 23 into which pins for positioning the cassette 1 are inserted, recesses 24, 25 used for detecting insertion of the cassette 1 in the peripheral face on the shutter plate 9 installation side, and apertures 26 for preventing writing in the peripheral portion of the disc opposite to the side where the shutter plate 9 is installed. Recesses 28 are provided in the side faces close to the apertures 26 of the case 2, and write-preventing control pieces 29 for opening and shutting the apertures 26 are located in the recesses 28.

Figure 5:
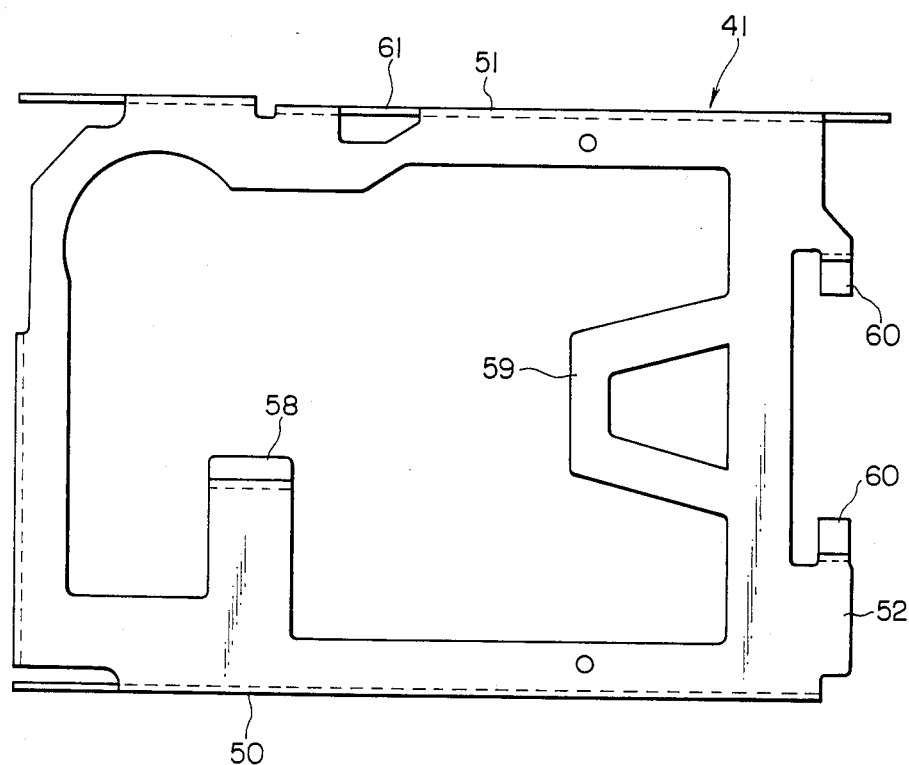
FIG. 5 is a top view of an upper cover used in the present invention.

A cassette loader for loading the magnetic disc cassette 1 thus constructed will subsequently be described. With reference to FIGS. 4 through 7, the cassette loader includes a chassis 42, a swivel cassette holder 40 supported by the chassis 42 through a shaft, an upper case 41, and a presser member 66 mounted on the cassette holder 40. The chassis 42 is equipped with a support 44 having a pin 43 as a support pivot for the upper case 41, a support 46 having a pin 45 as a support pivot for the holder 40, and pins 47, 48 for positioning the cassette 1. A spindle hub 105 projects from the surface of the chassis 42. As shown in FIG. 4, the upper case 41 is provided with a surface plate 52 and side plates 50, 51 formed by bending both edges of the surface plate. In the base end portions of the side plates 50, 51 is formed a portion 53 for engaging with the pin 43, the portion 53 being rotatably supported by the pin 43. The upper case 41 in FIG. 4 is rotatably biased counterclockwise, that is, in a direction opposite to the chassis 42, by a spring 55 extending across the case and the latch 54 of the chassis 42. As shown in FIG. 4, a limit is imposed on the swivel motion when an engagement portion formed 56 on the side plate 50 makes contact with a boss 57 on the chassis 42. On the surface plate 52 of the upper case 41 are provided, as shown in FIG. 5, a bend 58 for vertically moving an upper magnetic pad at a position closer to the base end, a presser 59 for pressing the disc hub, and lifters 60 for lifting the holder 40 at a position close to their free ends. A cut step 61 is provided in the side plate 51.

Figure 6:
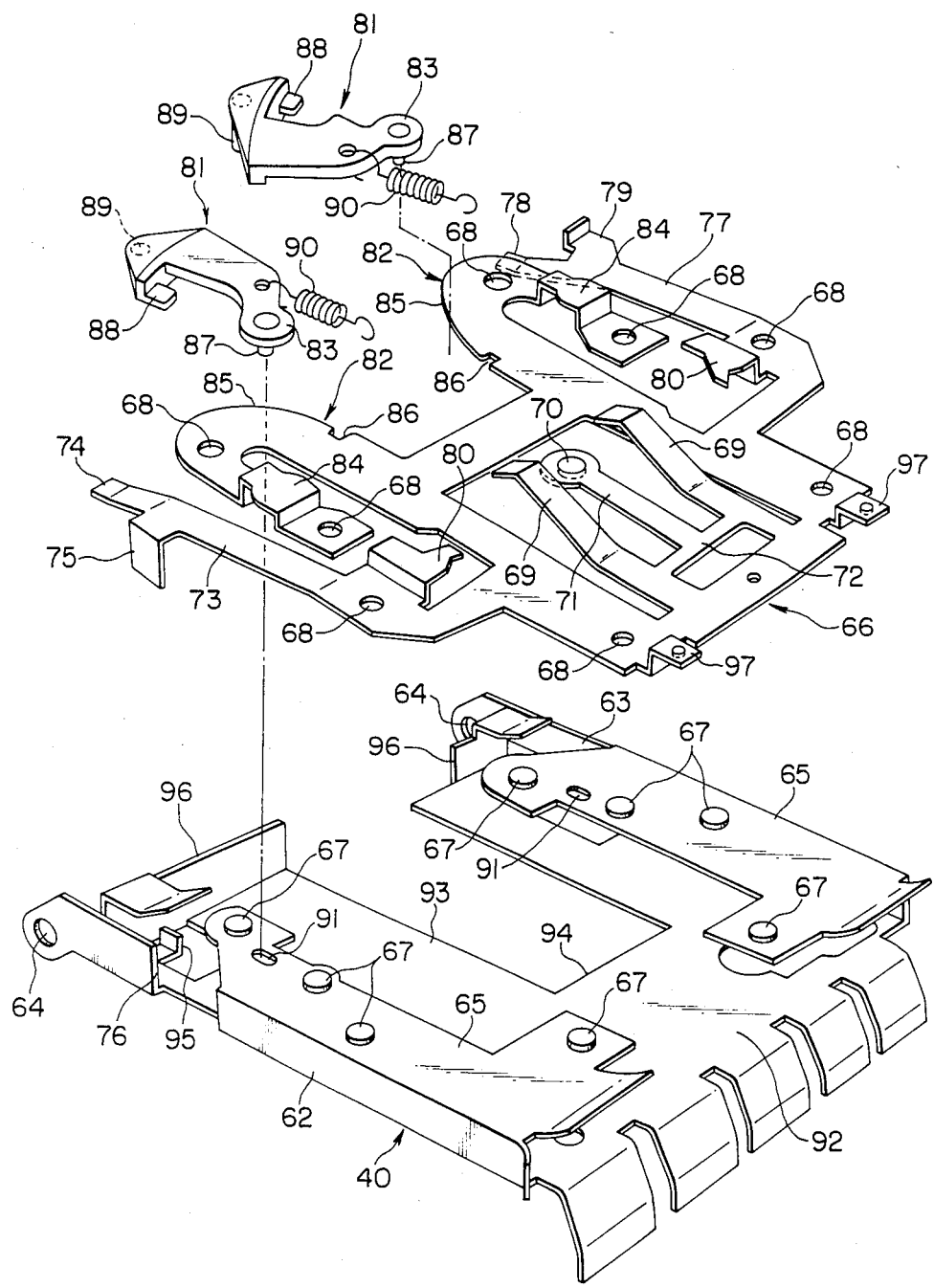
FIG. 6 is an exploded perspective view of part of a cassette holder embodying the present invention.

FIG. 6 is a diagram illustrating the holder 40, which includes left and right surface plates 65, side plates 62, 63 contiguous to these surface plates, and an under surface plate 93 combining the side plates in such a manner as to receive the cassette 1. Pin apertures 64 for receiving the pins 45 as support pivots are formed in the base ends of the side plates 62, 63. A suitable number of bosses 67 are provided on the surface plates, and the apertures 68 of presser member 66 are engaged therewith. The presser member 66 is fastened to the surface plate 65. The presser member 66 has a pair of bends 69 extending from its front end to an inner portion, and a hub presser piece 71 with a recessed part 70 whose free end protrudes downwardly. The base of the hub presser piece 71 is coupled to both the bends 69 through a coupling piece 72 to make the hub presser piece 71 bend when the bends are bent. Arm-like side pieces 73, 77 are incorporated with the presser member 66 on its left and right sides. The front end 74 of the left side piece 73 in FIG. 6 is slightly bent downward, and a bent piece 75 contiguous to the side piece 73 is formed. The bent piece 75 is located at a cut 76 in the side plate 62 of the holder 40. The front end 78 of the right side piece 77 is also slightly bent downward. The side piece 77 is slightly shorter than the other side piece 73, and the side piece 77 is provided with an externally embossed piece 79. On the bases of the side pieces 73, 77 are provided spring hanger pieces 80 internally facing each other. Holders 82 for holding closing members 81 for opening and shutting the shutter plate 9 inside the side plates 73, 77 are incorporated with the presser member 66. The holders 82 have pressers 84 for covering the bases 83 of the closing members 81, cams 85 used as guides when the closing members 81 are turned, and regulating step portions 86 for regulating the swivel positions of the closing members 81. The closing members 81 are provided with pins 87 used as swivel pivots, bosses 88 located under the holder 82 and used as guides for the swiveling closing members 81, and pins 89 engaging the recess 30 in the shutter plate 9 and sliding the shutter plate 9. The closing members 81 are capable of pivoting on pins 87, the pins. 87 being inserted into the apertures 91 of the holder 40. Due to the resiliency of the springs 90 extending across the hanger pieces 80 of the presser member 66, the left and right closing members 81 in FIG. 6 are rotatably biased clockwise and counterclockwise, respectively. Consequently, the swiveling of the closing members 81 is regulated by the energizing force as the sides thereof come in contact with the regulating portions 86 of the presser member 66. Above the bases 83 of the closing members 81 are provided the pressers 84 of the presser member 66, fastened to the holder 40 by the bosses 67 to prevent the closing members 81 from slipping off. Although the closing members 81 are allowed to swivel in such a manner as to slide on the surfaces of the holders 82 of the presser member 66, it is ensured that the closing members 81 are retained because the bosses 88 are positioned under the holder 82. An inlet 92 for receiving the cassette is formed in the free end of the holder 40, and, in the center of the under surface plate 93 of the holder 40, there are provided a spindle hub 105 and a cut 94 for receiving the head carriage. A boss 95 for preventing erroneous insertion of the cassette is provided in the left-hand interior of the holder 40 in FIG. 6. In the interior of the holder 40 is provided a bend 96 to determine the position of the cassette 1 when the rear end thereof touches the bend 96.

Figure 7:
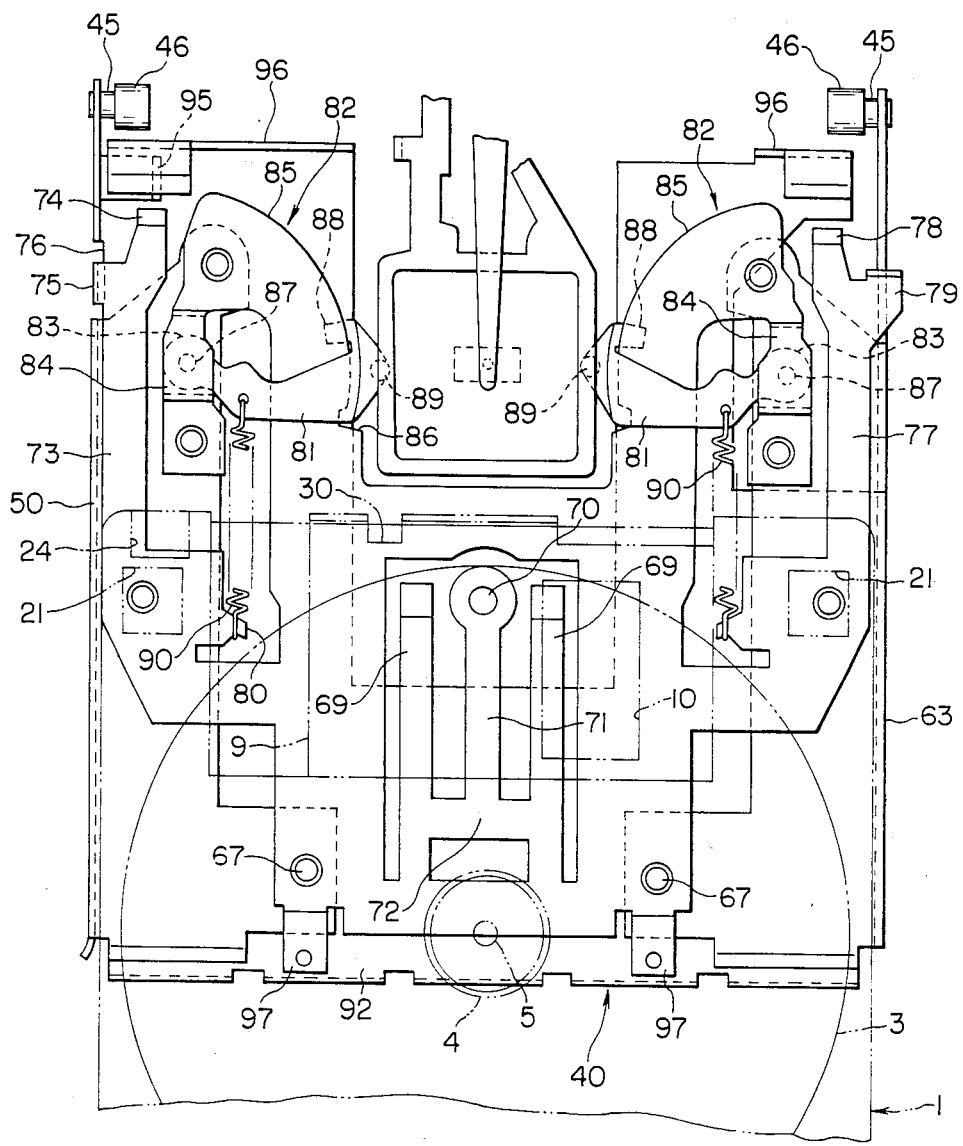
FIG. 7 is a top view of a mechanism of the present invention.
Figure 8:
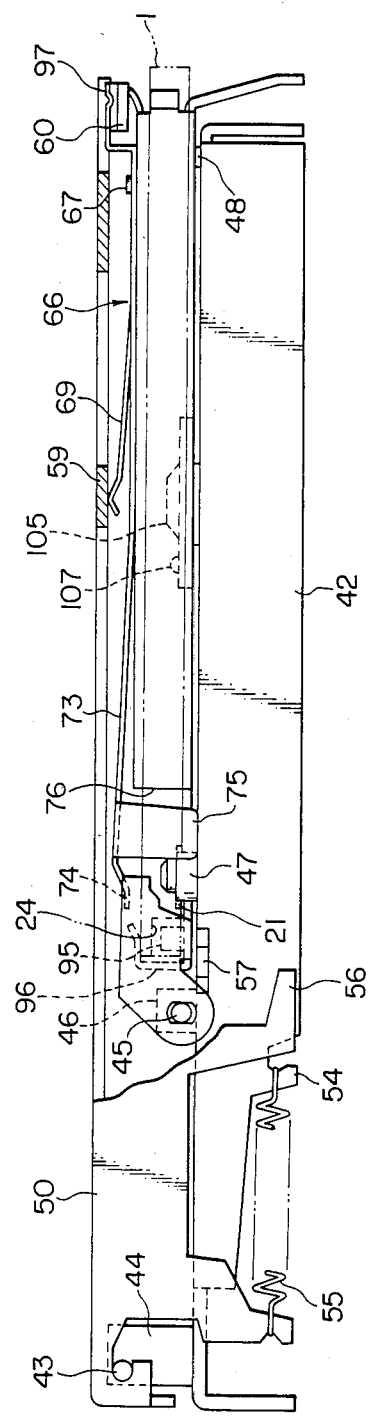
FIG. 8 is, in reference to FIG. 4, a side view illustrating a different operational mode embodying the present invention.
Figure 9:
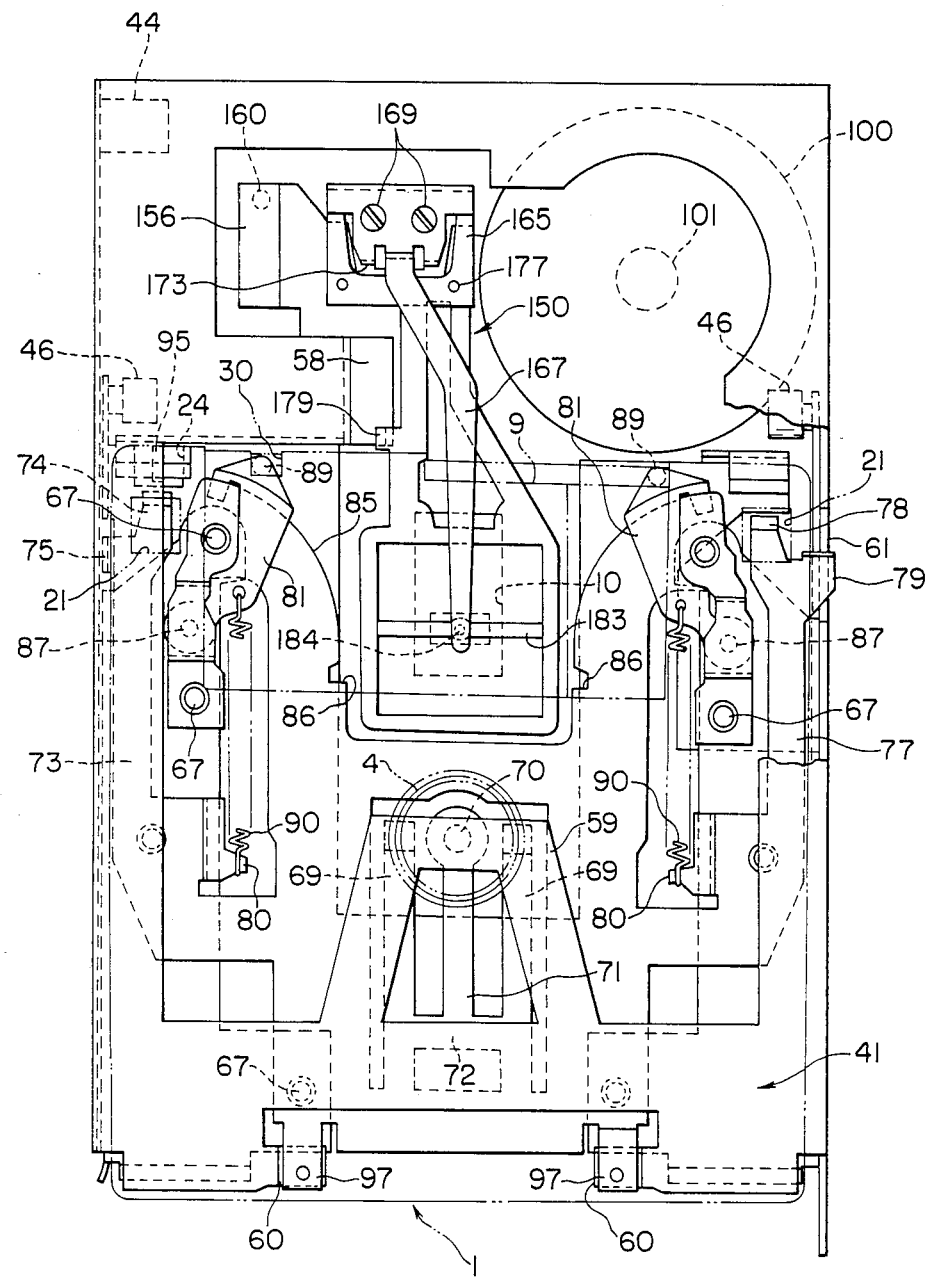
FIG. 9 is, in reference to FIG. 7, a top view illustrating a different operational mode embodying the present invention.

Referring to FIGS. 4, 7 and 9, the operation of the above-described cassette loader will be described. In FIG. 7, when the disc cassette 1 is inserted into the inlet 92 with its shutter plate side directed to the interior, the pin 89 of the closing member 81 on the left-hand side in the drawing is fitted into the cut 30 of the shutter plate 9 and the pin 89 is pushed by the wall of the cut 19 (see FIG. 1) in the case 2 in such a manner that the left closing member 81 turns counterclockwise. As the closing member 81 turns, the pin 89 moves to the left along a circular arc, and consequently the shutter plate 9 is pushed to the left, whereby the window 10 of the shutter plate 9 registers with the opening 8. That is, the shutter is opened. Although the right closing member 81 is also turned clockwise since its pin 89 is pushed by the wall of the cut 20 (see FIG. 1) in the case 2, the movement of the shutter plate 9 is unaffected because no cut for engaging the pin 89 is provided in the shutter plate 9 on the right. When the cassette 1 is further pushed inwardly while the shutter plate 9 is thus moved with the shutter being opened, the recess 24 of the case 2 will mate with the boss 95 of the holder 40 and the bend 96 of the holder 40 will come into contact with the end face of the case 2 upon reaching the insertion limit. When the cassette 1 is fully inserted, although the front end 74 of the side piece 73 of the presser member 66 is pushed up by the case 2, the front end 74 will enter the recess 21 of the case 2 if the cassette is inserted completely to the insertion limit where further movement of the cassette 1 is restrained. After the cassette 1 has thus been loaded, information signals can be recorded onto and read from the disc 3 by turning the case 41 from the state of FIG. 4 to that of FIG. 8.

There are provided a pair of engaging pieces 97 at the front end of the presser member 66. When the engaging pieces 97 are hooked on bent bosses 60 and the upper case 41 is caused to swivel above the chassis 42 (as shown in FIG. 4), the holder 40 is also made to swivel above the chassis 42. However, if the upper case 41 is pushed down, the holder will also swivel down. When the upper case 41 covers and shuts the lower case (not shown), this state is held by a lock mechanism (not shown).

FIG. 8 shows the state in which the upper case 41 has been pushed down so as to allow recording and reproducing operations. Because the pivotal position of the holder 40 differs from that of the upper case 41, the bends 69 of the member 66 are pressed by the presser 59 of the upper case 41 before the state of FIG. 8 is reached and they are bend downwardly, as a result of which the holder 40 is downwardly energized. As the hub presser piece 71 is coupled to the bases of the bends 69 through the coupler piece 72, the hub presser piece 71 will also be bent down when the bends 69 are bent down. At the recording and reproducing position of FIG. 8, the bosses 5 of the disc hub 4 are pushed by the downwardly embossed recess 70 at the front end of the hub presser piece 71 to ensure that the disc hub 4 is mounted on the spindle hub 105. When the holder 40 is pushed down by the upper case 41, the bend 75 of the presser member 66 contacts the chassis 42 before the holder 40 reaches the marginal swivel position, and, when the holder 40 is further pushed down, the front end 74 of the side piece 73 of the presser member 66 is pushed up. Consequently, the front end 74 is allowed to escape from the recess 21 of the case 21 and the cassette 1 is released from the holder 40 and correctly positioned by the positioning pins 47, 48 on the chassis. The pin 47 contacts the bottom of the recess 21 of the case 2 of the cassette 1 and the front end of the pin 47 enters the circular arc 23 of the case 2. The pin 48 contacts the under surface of the case 2 to control the front, rear, upper and lower positions of the cassette 1. As one side piece 77 of the presser member 66 is slightly shorter than the other side piece 73, the front end 78 of the side piece 77 is still not allowed to engage with the end face of the recess 21 of the case 3 (as shown in FIG. 9) while the position of the cassette 1 is thus controlled. The bend 58 is lowered by pushing down the upper case 41, and accordingly the upper carriage holding the upper magnetic pad is lowered to reach the recording and reproducing position. In FIG. 9, reference numeral 100 designates a d.c. motor, attached to the chassis to drive and rotate the disc 3 and also move the magnetic pad. Reference numeral 101 indicates a motor pulley.

In order to discharge the cassette 1, it is unlocked by a lock mechanism (not shown), using the resilience of the spring 55 to turn the upper case 41 and the cassette holder 40. When the upper case 41 is turned counterclockwise by the spring 55, the engaging piece 97 of the presser member 66 fixed by the holder 40 is pushed up by the bent piece 60 of the upper case 41. The front end of the pin 47 is thus caused to escape from the positioning aperture of the cassette 1, whereupon the cassette 1 is urged to move out because of the resilience of the springs 90 of the closing members 81. However, the front end 78 of the side piece 77 of the presser member 66 touches the interior wall of the recess 21 of the cassette 1, thus restraining the cassette 1. When the upper case 41 is further turned, the cut step 61 provided in the upper cover 41 is pushed up the boss 79 of the presser member 66 to disengage the front end 78 from the recess 21 of the cassette 1, causing the cassette 1 to be pushed out because of the swivel force derived from the closing member 81 based of the resilience of the spring 90. When the closing member 81 swivels back, the shutter plate 9 returns to its former position, whereby the shutter is closed.

The driving mechanism for rotating the disc 3 and another for moving the magnetic head will subsequently be described.

Figure 10:
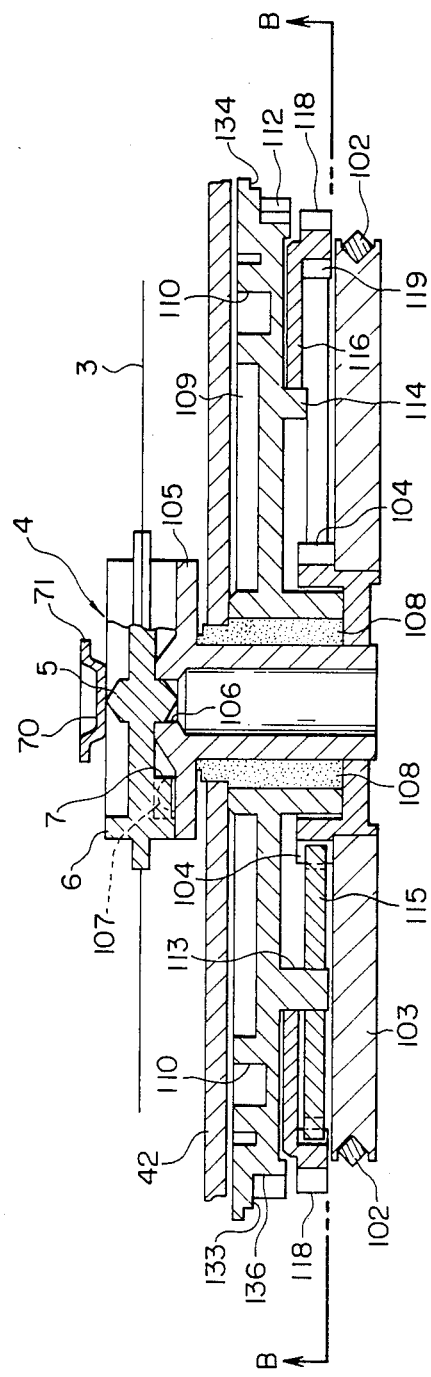
FIG. 10 is a vertical sectional view of a cam and related components used for moving a magnetic head.

In FIG. 10, a bearing 108 is inserted and fixed on the under surface side of the chassis 42, and the shaft of the spindle hub 105 is rotatably supported by the inner perimeter of the bearing 108. The boss of a small diameter gear or rotary body, 104 is engaged with and fixed to the shaft of the spindle hub 105 protruding from the lower end of the bearing 108, and a rotary, or rotating, body 103 is engaged with and fixed to the boss of the gear 104. The outer perimeter of the rotary body 103 is used as a pulley. A belt 102 passes around the pulley, and also around the pulley 101 of the motor 100. Thus, while the motor 100 is rotating the rotary body 103, the gear 104 and the spindle hub 105 rotate together. In the center of the spindle hub 105 is formed an aperture 106 for receiving the lower boss 5 provided in the center of the disc hub 4. Moreover, a boss 107 for driving the disc 3 by engaging with the engaging boss 7 of the disc hub 4 is formed on the spindle hub 105.

Figure 11:
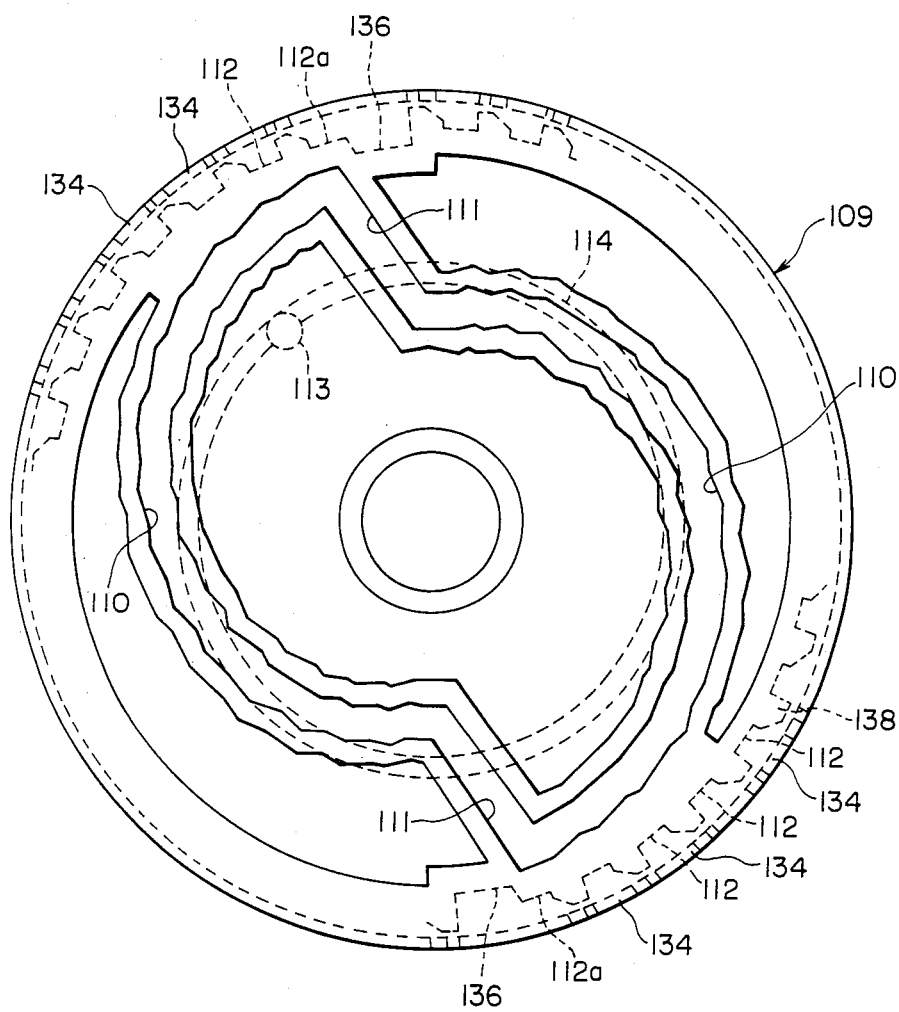
FIG. 11 is a top view of the cam.
Figure 12:
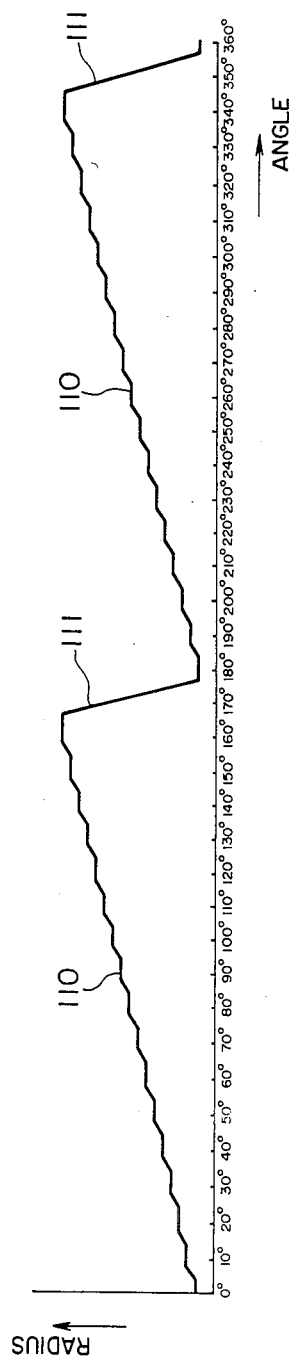
FIG. 12 shows the edge of the cam.
Figure 21:
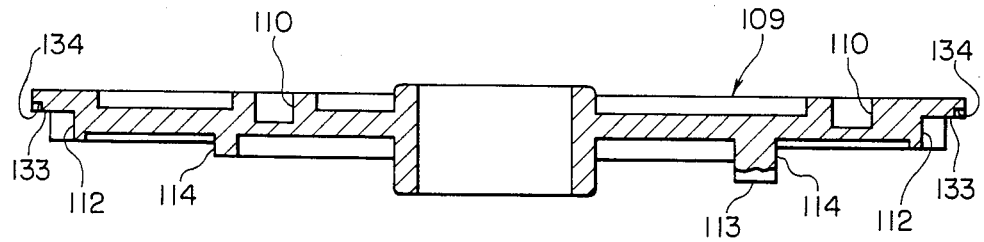
FIG. 21 is a vertical sectional view of the cam of the second embodiment.

A rotary cam body 109 is rotatably fitted in the outer perimeter of the bearing 108 to move the head carriage. As shown in FIGS. 11 and 21, a cam groove 110 for moving the head carriage is formed in the surface of the cam 109. The cam groove 110 has, as an example, 17 steps such that it divides the cam 109 into semicircles and its distance from the center thereof changes by stages. A coupler groove 111 couples the cam groove 110 portion closer to the center provided in one semicircle portion and the other farther from the center provided in the other semicircle. FIG. 12 illustrates the cam grooves 110 and 111 and shows changes in distance from the center.

Figure 13:
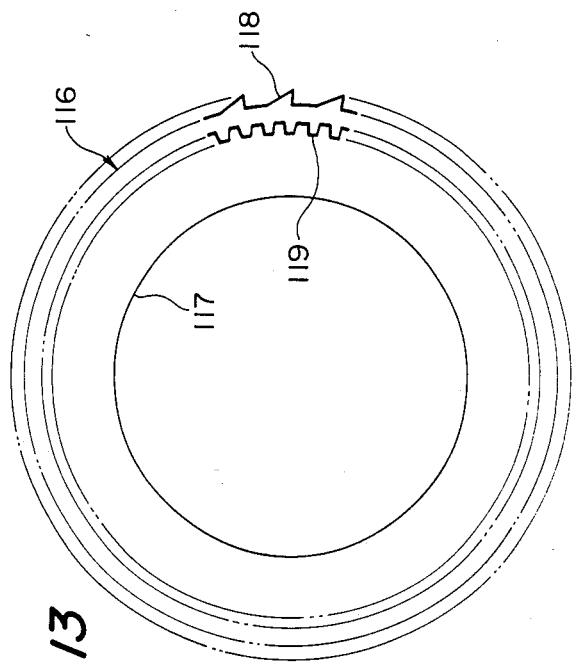
FIG. 13 is a top view of an annular gear.
Figure 14:
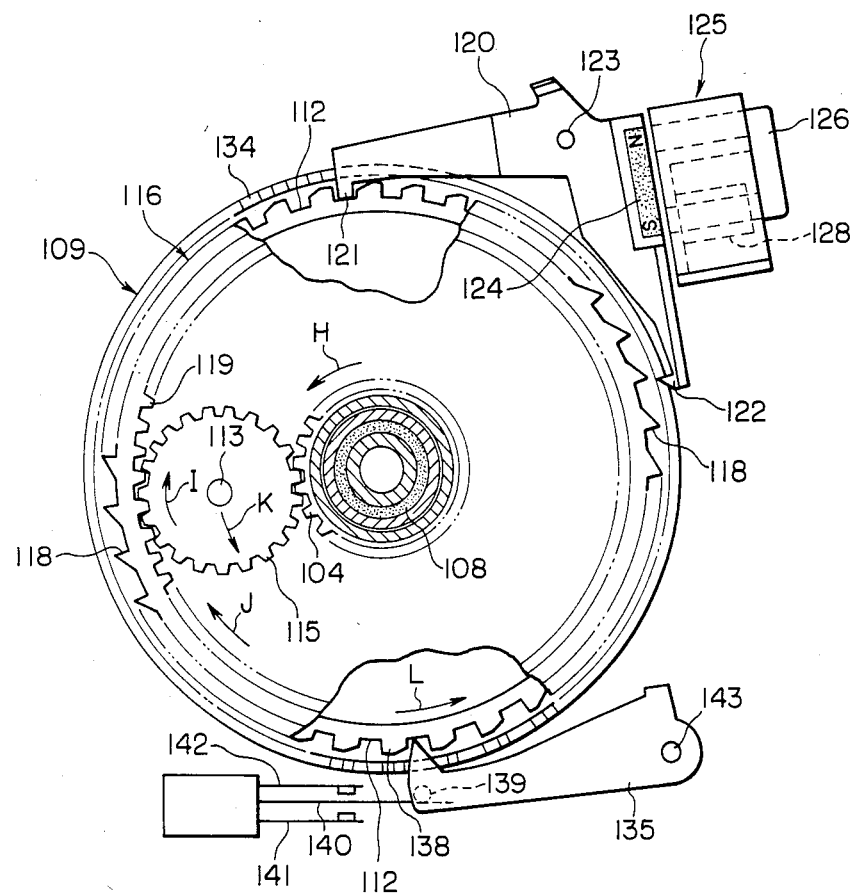
FIG. 14 is a fragmentary sectional top view of a rotary converter device.
Figure 15:
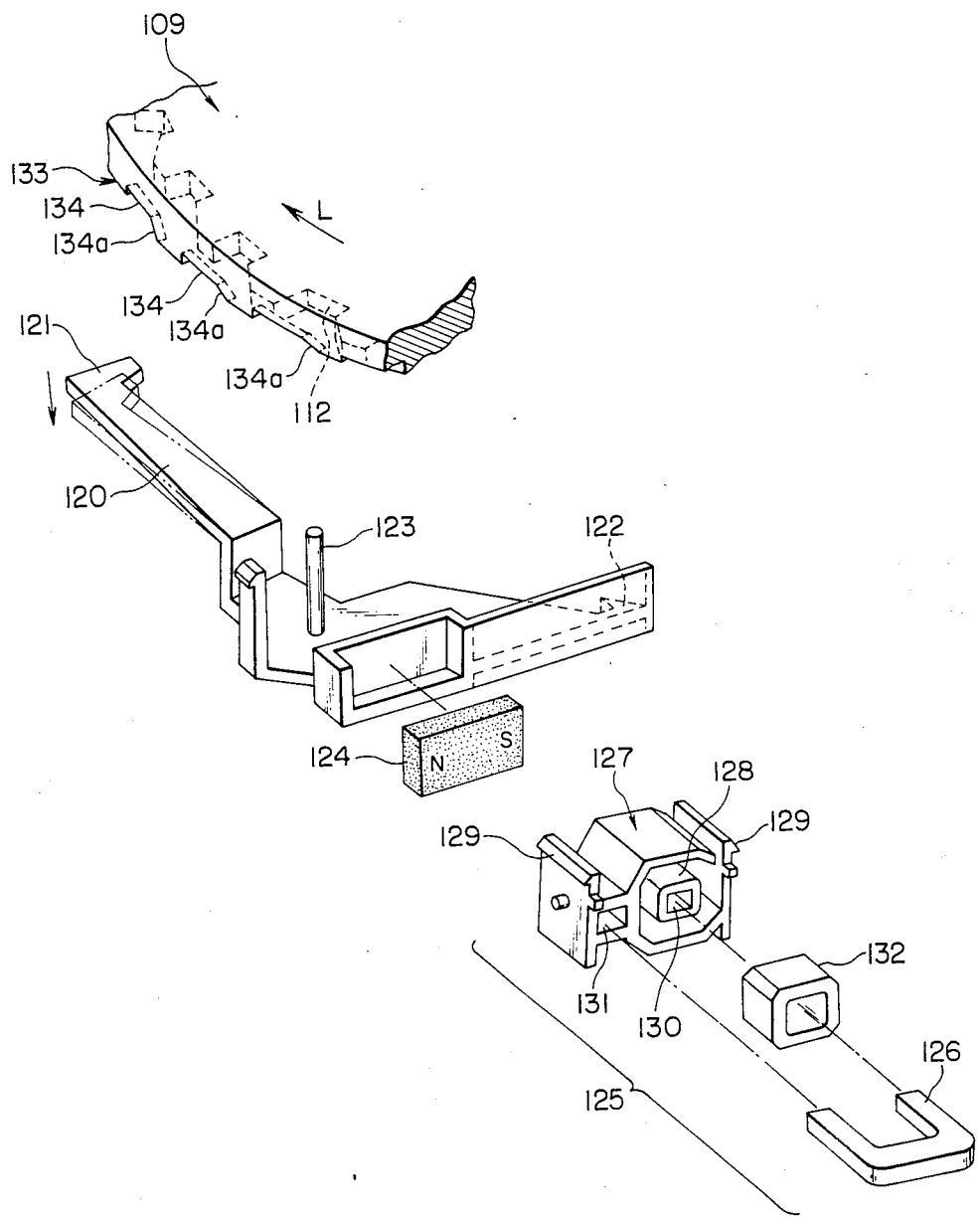
FIG. 15 is an exploded perspective view of a control mechanism used in the rotary converter.
Figure 20:
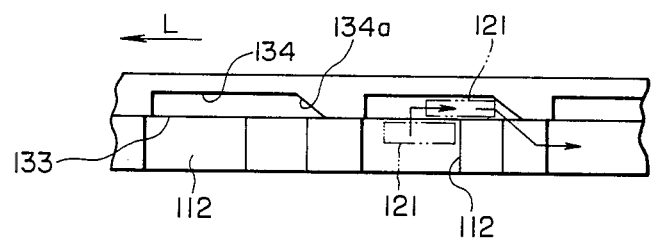
FIG. 20 is an enlarged partial view of a cam of the second embodiment.

Engagement recesses 112, each corresponding to the step positions of the above-described groove 110, are formed in the outer perimeter of the cam 109 on its under surface side, and an annular boss 114 is formed in the middle portion in between the center of the cam 109 and the outer perimeter thereof. A downwardly embossed pin 113 is formed in part of the annular boss 114. There are also provided a gear 115 rotatably engaging with the pin 113, as shown in FIGS. 10 and 14 (top view taken on line B—B in FIG. 10), and an annular gear 116 rotatably engaging with the outer perimeter of the annular boss 114. The gear 115 engages with both an introvertive gear teeth 119 formed on the inner perimeter of the annular gear 116 and the small diameter gear 104. As shown in FIG. 13, ratchet engagement gear teeth 118 are provided on the outer perimeter of the annular gear 116, corresponding to the steps of the cam groove 110. Engagement grooves 134, corresponding to the engagement recesses 112, are formed in the outermost positions of the engagement recesses 112 of the cam 109 and subordinate positions thereof, as shown in FIGS. 15, 20 and 21. Assuming that the cam 109 rotates in the direction of an arrow L, the rear end of the engagement groove 134 forms an inclined face 134a and joins the under surface 133 of the engagement groove 134.

As depicted in FIGS. 14 and 15, a control lever 120 in the shape, of a bell crank is provided on the side of the cam 109, rotatably mounted on a shaft 123. A permanent magnet 124 is fixed to the side arm edge of the lever 120, and, as the permanent magnet 124 and an iron core 126 of an electromagnet 125 attract each other, the lever 120 in FIG. 14 is energized to turn counterclockwise. One hook-shaped arm end 121 of the lever 120 is normally allowed to enter the engagement recess 112 of the cam 109 and engage therewith. Although the other hook-shaped arm end 122 of the lever 120 is located opposite to the engagement gear teeth 118 on the outer perimeter of the annular gear 116, it is normally separated from the teeth gear 118. The arm where the hook-shaped arm end is formed has resilience in the vertical direction. When the arm end 121 engages with the engagement recess 112 of the cam 109, the arm is forced to bend and contact the subordinate position of the engagement groove 134, which formed in the shape of a canopy.

FIG. 15 shows the construction of the electromagnet 125. The electromagnet 125 includes a case 127, a coil 132 and an iron core 126, the coil 132 being fitted into a space between a boss 128, used to hold the coil and provided in the central portion of the case 127, and a tubular portion surrounding the boss 128. One leg of the horseshoe-shaped iron core 126 is engaged with and fastened to the central aperture 130 of the boss 128 for holding the coil, and the other leg passes through an opening 131 in the side wall of the case 127. Hook-shaped fittings 129 are formed on both sides of the case 127, and the electromagnet 125 is fixed to the chassis with the fittings 129, whereby the iron core 126 is located opposite to the permanent magnet 124.

Referring to FIG. 14, the operation of the cam 109 will be described. The rotary body 103 (see FIG. 10) together with the small diameter gear 104 is driven to rotate in the direction of an arrow H. In this case, when the one arm end 121 of the control lever 120 has entered and engaged with the recess 112 of the cam 109, the cam 109 is prevented from rotating, the other arm end 122 of the control lever 120 is separated from the engagement gear 118 of the annular gear 116 to free the annular gear 116, and the annular gear 116 is driven to rotate in the direction of an arrow J by the rotation of the gear 115 through the introvertive gear teeth 119. In other words, since only the annular gear 116 normally continuously rotates only while cam 109 does not rotate, the position of the head carriage remains unchanged.

In order to change the position of the head carriage, power is supplied to the coil of the electromagnet 125 to excite the iron core 126 to make it repel the permanent magnet 124. Accordingly, the control lever 120 in FIG. 14 turns clockwise and its arm end 121 is released from the engagement recess 112 of the cam 109 while the other arm end 122 of the lever 120 engages with the engagement gear 118 of the annular gear 116. The cam 109 thus becomes rotatable, whereas the annular gear 116 is prevented from rotating. As the gear 115 is driven to rotate in the direction of an arrow I, the pin 113 of the gear 115 is consequently moved in the direction of an arrow K while the cam 109 is driven to rotate in the direction of the arrow L. As the cam 109 rotates, the position of a guide pin 159 (described below) inserted in the cam groove 110 moves in the radial direction of the cam 109, causing the head carriage to move.

Assuming that power is supplied to the coil 132 of the electromagnet 125 for an instant, the control lever 120 in FIG. 14 attempts to return to the former position immediately after it has turned clockwise. However, the arm at the hook-shaped end 121 of the lever 120 is bent downwardly because of its resilience and is made to contact the under surface 133 where the engagement groove 134 of the cam 109 is formed. When the lever 120 thus turns, the hook-shaped arm end 121 is hooked onto the engagement groove 134 provided on the outer perimeter of the cam 109, and thus the lever is prevented from returning to its former position. In this state, the other arm end 122 of the lever 120 continues to engage with the annular gear 116, causing the cam 109 to attempt to rotate in the direction of the arrow L. As the cam 109 rotates, the arm end 121 of the lever 120 is pressed down against the inclined face 134a of the engagement groove 134, and, when it reaches the same level as the under surface 133, it is released from the engagement groove 134 and enters the engagement recess 112, whereby the cam 109 is again prevented from rotating. In case the electromagnet 125 is thus excited for an instant, the cam 109 is allowed to rotate through an angle corresponding to one tooth spacing and the head carriage is moved by an amount equivalent to one track.

In FIGS. 16 through 19, the head carriage 152 supporting the magnetic head is principally composed of an upper carriage 150 and a lower carriage 151. In the position of the lower carriage 151 where the head is attached, a magnetic head 154 is supported through a gimbal plate 153, the magnetic head 154 being capable of oscillating within a specific range. Tubular pin receptacles 155, 156 are provided on one side of the lower carriage 151. When the carriage is fixed to the chassis, it is arranged so that the carriage 151 is supported by support pins 160 fixed to the chassis, the pin receptacles 155, 156 contacting the support pins 160 from above. The other side edge of the carriage 151 is also supported by the pin 161. The carriage 151 is provided with an upwardly cut bend 157, and the overall carriage is energized downwardly and in the radial direction by a spring 162 extending between the upwardly cut bend 157 and the chassis. The pins (not shown) fixed to the chassis are lightly pressed against the flat face 158 of the carriage 151 from above to prevent the carriage from floating. A guide pin 159 is provided at the front end of the carriage 151, and the carriage is moved when the pin 159 engages with the groove 110. An upwardly cut bend for attaching the upper carriage 150 is provided in the carriage 151, and screw holes 164 are formed in the upwardly cut bend 163. A screw 169 passing through a hole 166 in a leaf spring 165 and a hole 168 in a presser spring 167 for pushing down the carriage 150 is driven through the screw hole 164, whereby the presser spring 167 and the leaf spring 165 are fastened to the upwardly cut bend 163 of the carriage 151. The bent piece 170 of the leaf spring 165 contacts the end face 171 of the upwardly cut bend 163 and the bent piece 172 of the presser spring 167 pushes down the bent piece 170, whereas a pair of bent hanger pieces 173 formed in the presser spring 167 push down and engage a portion 175 of the groove aperture 174 of the leaf spring 165 to ensure that the leaf spring 165 is fitted in the upwardly cut bend 163.

Figure 18:
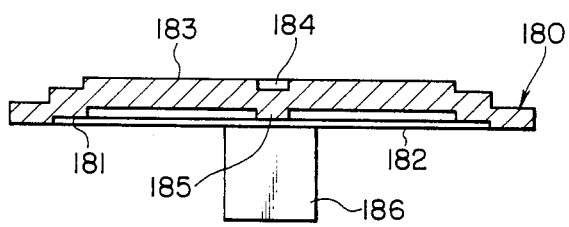
FIG. 18 is a cross-sectional view taken on a line A—A in FIG. 17.
Figure 19:
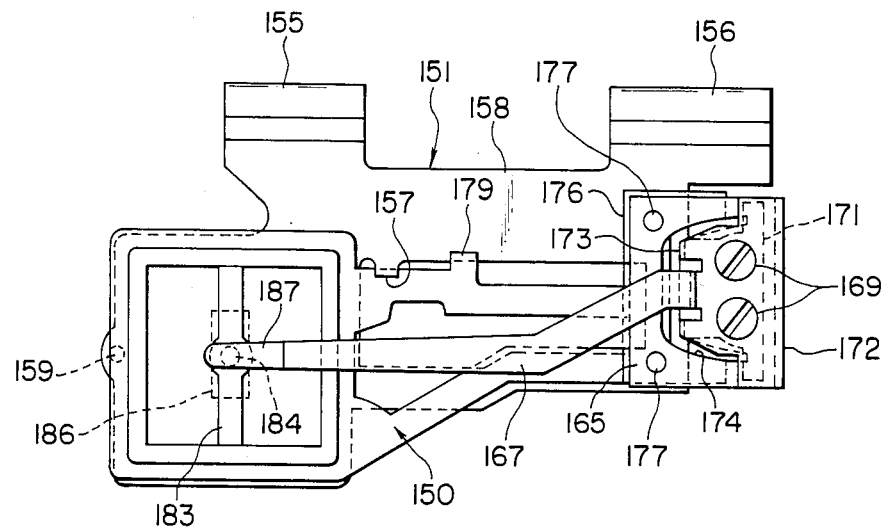
FIG. 19 is a top view of a magnetic support mechanism of a second embodiment of the invention.

Two pins 177 are fixed to the base 176 of the upper carriage 150, and the pins 177 are inserted into the apertures 178 of the leaf spring 165 to attach the carriage 150 to the leaf spring. In the middle of the carriage 150 is provided a bent piece 179. Since the bent piece 179 is made to engage with the bend 58 of the upper case 41 as described above, when the upper case is lifted up, the bend 179 will be lifted up due to the bend 58 so that the carriage 150 is brought to an elevated location. A pad fitting 180 is formed at the free end of the carriage 150. As shown in FIG. 18, the pad fitting 180 is provided with a shallow recess 181 in the under surface, and the recess 181 is adhered to a gimbal plate 182. A window is formed in the pad fitting 180 and a center plate 183, extending over the center of the window, is also formed. In the center of the center plate 183 is provided a recess 184. The lower end 185 of the recess 184 pushes down the central portion of the pad 186 through the gimbal plate 182. The pad is made of the same material as that, for instance, used for the magnetic head 154. The pad 186 is capable of carrying out a gimbal operation with the lower end of the recess 184 as a fulcrum. The front end 187 of the presser spring 167 is used to press the recess 184 of the pad fitting 180 from above and energize the carriage 150 toward the carriage 151.

Figure 16:
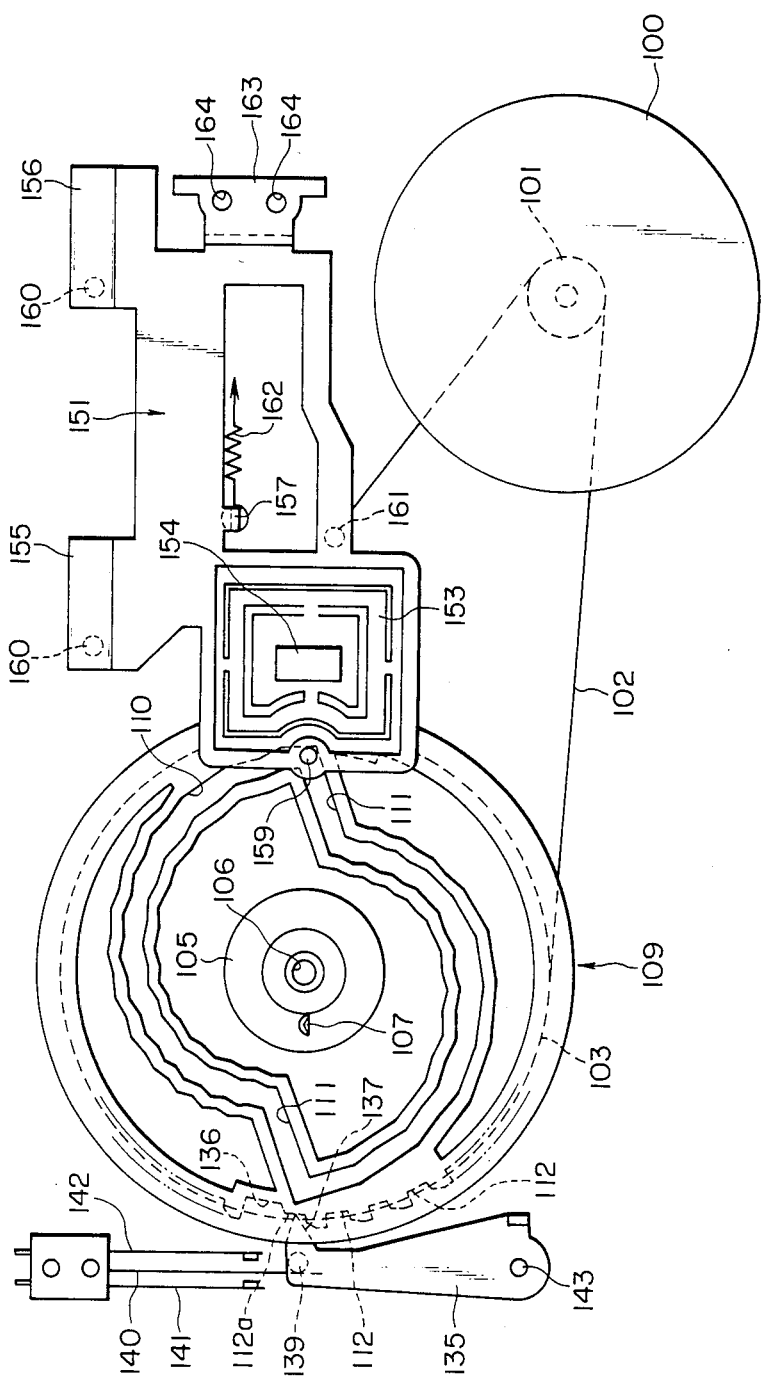
FIG. 16 is a top view of a mechanism used for moving the magnetic head.
Figure 17:
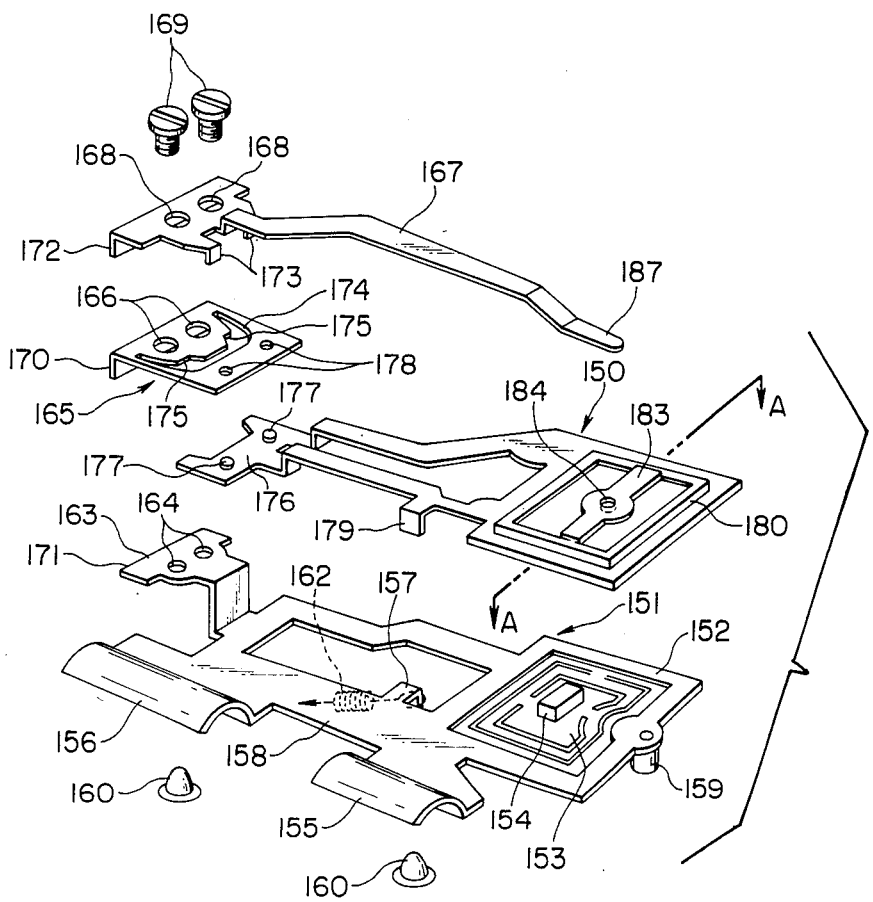
FIG. 17 is an exploded perspective view of a magnetic head support mechanism.

As seen in FIGS. 14 and 16, the head position detecting lever 135 is rotatably supported around the pivot 143 on the side of the cam 109. The pin 139 is fixed to the free end of the detecting lever 135, a switch contact piece 140 is pressure-connected to the pin 139, and the lever 135 is energized to swivel in a direction in which the hook-shaped free end 137 thereof contacts the hanger recess 112 of the cam 109. The free end 137 of the lever 135 is arranged so that, when the guide pin 159 of the head carriage is located on the outer periphery of the cam groove 110 and the magnetic head 154 is located so as to slide on the first track on the outer periphery of the disc 3, the free end 137 may engage with the hanger recess 112a corresponding to the first track. The hanger recess 112a is made contiguous to the recess 136 for detecting the restoration of the reference position where the guide pin 159 is located at 111. Although the above-described hanger recess 112a has the same depth as that of the other hanger recesses 112, the depth of the recess 136 for detecting the restoration of the reference position should be made greater than that of the recesses 112. While the free end 137 of the detecting lever 135 engages with the hanger recesses 112, 112a, the switch contact piece 140 is separated from the switch contact pieces 141, 142 located on both sides thereof. While the free end 137 of the lever 135 is received in the detecting recess 136, the contact piece 140 contacts the contact piece 142 and detects the contact piece 140 being in contact with the contact piece 142 and the cam 109 being located in the reference position, whereas the contact piece 140 contacts with the contact piece 141 when the free end 137 of the lever 135 runs on the boss 138 across the hanger recess 112.

FIG. 16 shows a state in which the guide pin 159 is located in the outer peripheral position of the cam mechanism 110 and the head position detecting lever 135 is at the hanger recess 112a position, corresponding to the first track next to the recess 136, for detecting return to the reference position. It is assumed that the cam 109 is driven to rotate through an angle corresponding to one tooth spacing of the boss 138 across the hanger recess 112. When the cam 109 rotates, the guide pin 159 shifts step by step along the cam edge of the cam mechanism 110 on its center side, and the position in which the magnetic head 154 slidably contacts the track of the disc 3 shifts by one step relative to the track on the inner perimeter side. Each time the cam 109 rotates by an amount equivalent to one tooth spacing of the boss 138, the switch contact pieces 140, 141 make contact, causing a signal to be produced. By counting these signals, it is possible to detect which track is in contact with the sliding magnetic head 154. When the free end 137 of the detecting lever 135 engages with the recess 136 for detecting return to the former position, the switch contact pieces 140, 142 contact. The signal produced therefrom can be used to detect the fact that the cam 109 is located at its reference position, that is, the position in which the guide pin 159 engages with the coupler groove 111 coupling two cam grooves 110. As the sliding position of the magnetic head 154 is always accurately detected, the magnetic head 154 can be made to slide to a desired track by counting the signals resulting from the contact of the contact piece 140 with the contact piece 141 or that of the contact piece 140 with the contact piece 142.

Figure 22:
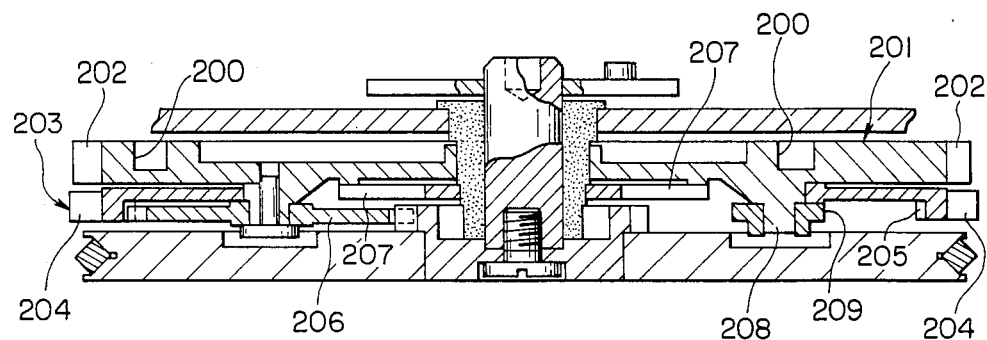
FIGS. 22 to 24 still another embodiment of the invention.
Figure 24:
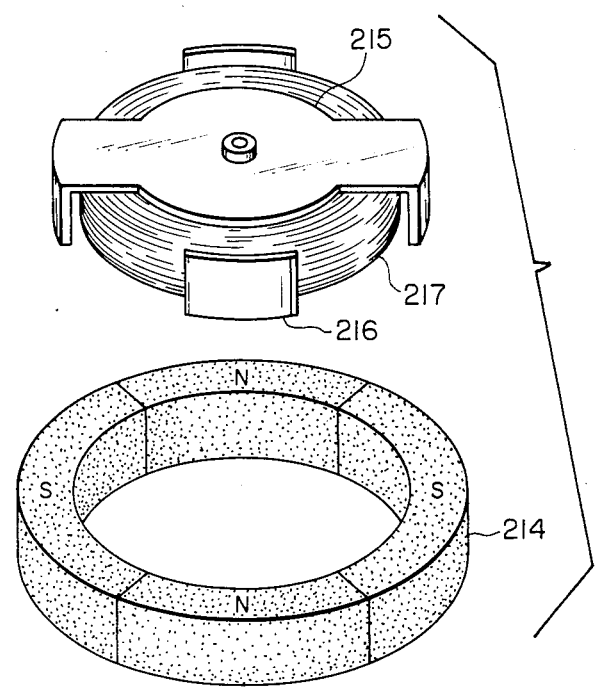
Figure 23:
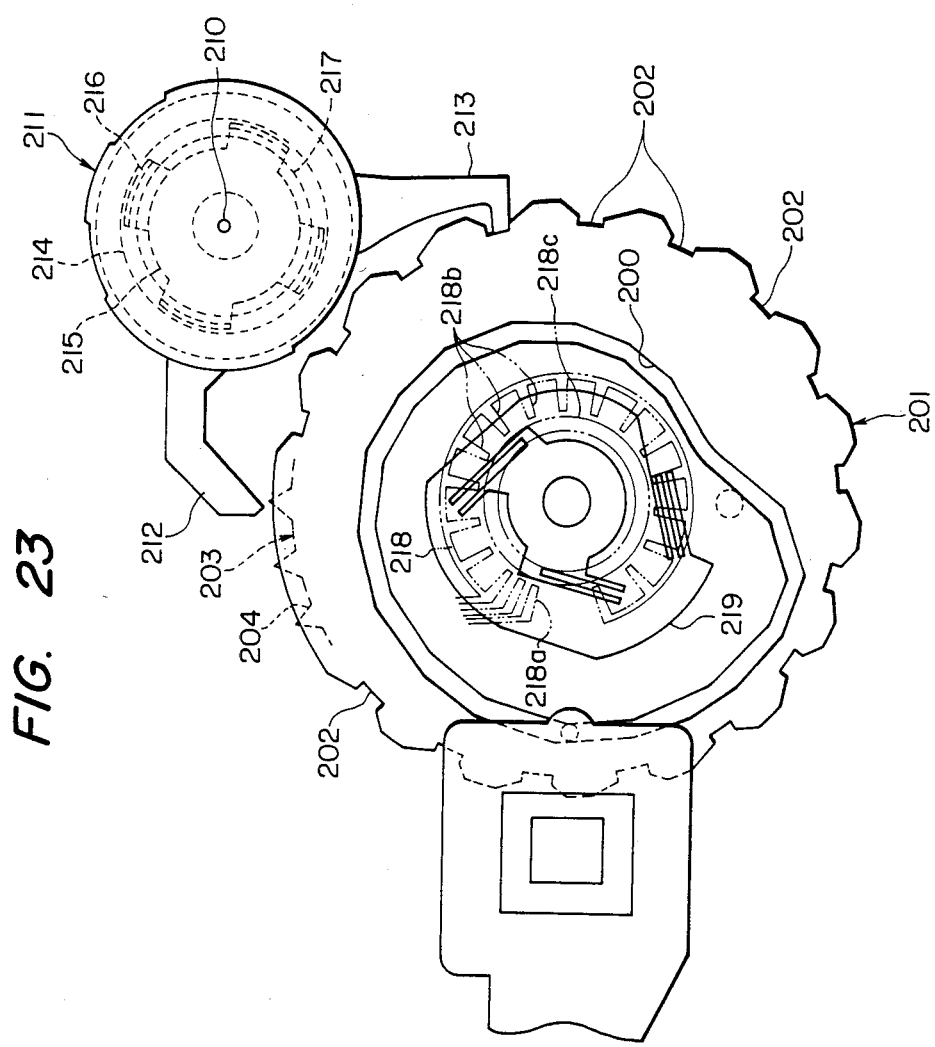

FIGS. 22, 23 and 24 show another embodiment of the present invention, here in the form of a mechanism used for driving the disc 3 to rotate and a magnetic head moving mechanism.

In FIG. 22, corresponding to FIG. 10, a hanger recess 202 corresponding to each step position of a cam groove 200 is provided in a cam 201 having the cam groove 200. However, the cam groove 200 according to this embodiment is so arranged that the magnetic head makes a reciprocal movement once each complete rotation of the cam 201. As in the case of the first embodiment, an annular gear 203 is provided with an engagement gear 204 and an introvertive gear 205. When the track position of the magnetic head is not being moved, rotation of-the cam 201 is suspended, and the annular gear 203 is rotated using a gear 206 engaging with the introvertive gear 205. In case the track position of the magnetic head is being moved, the rotation of the annular gear 203 is suspended, while the cam 201 is allowed to rotate using the gear 206 to move the track position of the magnetic head.

According to this embodiment, a support plate 207 for supporting the cam 201 is provided and a boss 208 of the cam 201 is supplied with a roller 209 to support the annular gear 203. These constitute a difference between the two embodiments.

FIG. 23 is a top view of a magnetic head moving mechanism. The mechanism for controlling the suspension of the rotation of the cam 201 and the annular gear 203 is provided in one body instead of employing both a bell crank-type control lever and an electromagnet. To this effect, a rotary case 211, rotatably supported on a pivot 210, incorporates arm ends 212, 213 for suspending the rotation of the annular gear 203 and the cam 201, respectively, and an annular permanent magnet 214 is fixed to the inside surface of the case 211. Plates 215, 216 made of silicon steel are, as shown in FIG. 24, located coaxially with the pivot 210, 90° out of phase and opposite to each other. An exciting coil 217 is located in a space formed by the two plates 215, 216. The assembly of the plates 215, 216 and the exciting coil 217 is located inside the annular permanent magnet 214 and the permanent magnet 214 (or the rotary case 211) is rotated in a prescribed direction upon supply of power to the exciting coil 217 so as to control the suspension of the rotation of the annular gear 203 and the cam 201. According to this embodiment, when power is not being supplied to the exciting coil 217, the arm end 213 suspends the rotation of the cam 210, and, when power is supplied to the exciting coil 217, the permanent magnet 214 rotates counterclockwise, causing the annular gear 203 to suspend rotation due to the action of the arm and 212 so that the position of the magnetic head can be charged.

In this embodiment of the present invention, the circuit pattern 218 composed of a flexible board and a contact member 219 sliding on the pattern face are used to detect the head track position. In this circuit pattern 218 are formed, as in the case of the first embodiment a pattern 218a for detecting return to the reference position, a track pattern 218b, and a ground pattern 218c of the same shape, provided in such a manner as to correspond to each track position. The flexible board having the circuit pattern 218 is fixed to the chassis, and the cut piece member 219 is fastened to the cam 201. Accordingly, the track position of the magnetic head can be detected, as in the case of the first embodiment, by allowing the cut piece of the cut piece member 219 to slide on the pattern face.

In the example shown, the magnetic disc cassette 1 is of a single-sided type, and bosses 24, 25 for preventing incorrect insertion are provided in the upper and lower portions of the cassette 1, whereby the cassette can be turned over for the magnetic head 154 installed on the lower side. Even when the cassette is turned over, incorrect insertion thereof is prevented. However, the boss 25 on one side of the cassette 1 may be dispensed with and the cassette 1 allowed to be inserted only in one way. Further, the magnetic head may be replaced with a pad 186 if the cassette 1 and the disc device are of the single-sided type. Moreover, the number of steps of the cam groove 110 of the cam 109 may be increased or decreased if necessary. It is also possible to allow the magnetic head to move from the track position on the outermost periphery of the disc to that on the innermost periphery as the cam 1 turns once. Furthermore, because the present invention provides a mechanism for making the magnetic head move intermittently in the radial direction of the disc utilizing the rotary movement of the single motor, the type of cassette and the construction of the cassette loading mechanism are not limited to what have been illustrated and may freely be changed. In addition, the mechanism for moving the magnetic head may be changed in terms of its design.

We claim:

1. A disk-type recording and reproducing apparatus comprising:
    a chassis having a spindle hub rotatably mounted thereon;
    a motor mounted on said chassis;
    drive means connected between said motor and said spindle hub for continuously rotating said spindle hub when said motor is operating;
    a cam disk mounted on said spindle hub for rotation relative thereto;
    an annular gear rotatably mounted on said cam disk;
    gear teeth disposed on said spindle hub;
    intermediate gear means mounted for rotation on said cam disk and disposed in meshing engagement with said gear teeth and said annular gear;
    said cam disk having a cam surface on the upper surface thereof comprised of stepped cam grooves connected by coupling grooves and engagement recesses peripherally disposed on the cam disk corresponding to each stepped cam groove;
    means on said spindle hub for supporting a magnetic disk for rotation therewith;
    a head carriage movably mounted on said chassis and disposed in engagement with said cam surface for movement in a radial direction relative to said spindle hub and having a magnetic head thereon for contacting said magnetic disk; and
    head movement control means pivotally mounted on said chassis for movement between a first position in engagement with said engagement recesses of said cam disk for preventing rotation of said cam disk and allowing said annular gear to continue rotating and a second position in engagement with said annular gear for preventing rotation of said annular gear while allowing rotation of said cam disk.

2. The disk-type recording and reproducing apparatus as set forth in claim 1 further comprising rotary position detecting lever means pivotally mounted on said chassis with one end thereof disposed in engagement with additional recesses on said cam disk for detecting restoration of the magnetic head at a reference position and
- switch means operatively connected to said rotary position detecting lever means for detecting which track of said cam disk is in contact with said magnetic head.

3. A disk-type recording and reproducing apparatus as set forth in claim 1, wherein said head movement control means comprises a bell crank lever pivotally mounted on said chassis,

- first engaging means on one end of said bell crank lever adapted to be disposed in engagement with said engagement recesses of said cam disk and
- second engaging means on the other end of said bell crank lever adapted to engage said first mentioned annular gear and
- means for pivoting said bell crank lever to selectively engage said first and second engaging means with said cam disk and said first mentioned annular gear respectively.

* * * * *